United States Patent [19]

Hanton et al.

[11] 4,262,632

[45] Apr. 21, 1981

[54] ELECTRONIC LIVESTOCK IDENTIFICATION SYSTEM

[76] Inventors: John P. Hanton, 1304 S. Willson; Harley A. Leach, 608 S. Twelfth, both of Bozeman, Mont. 59715

[21] Appl. No.: 464,118

[22] Filed: Apr. 25, 1974

Related U.S. Application Data

[63] Continuation-in-part of Ser. No. 430,564, Jan. 3, 1974, abandoned, which is a continuation of Ser. No. 304,776, Nov. 8, 1972, abandoned.

[51] Int. Cl.$^3$ .............................................. A01K 11/00
[52] U.S. Cl. ...................................... 119/1; 119/51 R; 128/631; 425/100
[58] Field of Search .................. 119/1, 3, 51 R, 14.14; 128/2 P, 2.1 A, 356; 325/118

[56] References Cited

U.S. PATENT DOCUMENTS

| | | | |
|---|---|---|---|
| 3,005,458 | 10/1961 | Brook et al. | 128/356 |
| 3,128,744 | 4/1964 | Jefferts et al. | 119/3 |
| 3,144,017 | 8/1964 | Muth | 325/118 X |
| 3,180,321 | 4/1965 | Aldinger | 119/51 R |
| 3,453,546 | 7/1969 | Fryer | 325/118 X |
| 3,465,724 | 9/1969 | Broadbent | 119/51 R |
| 3,557,758 | 1/1971 | Lack | 119/51 R |

FOREIGN PATENT DOCUMENTS

1190432  5/1970  United Kingdom ................ 119/14.14

OTHER PUBLICATIONS

Radio and TV News, Jun. 1957, p. 114.

*Primary Examiner*—Jay N. Eskovitz
*Attorney, Agent, or Firm*—Cooper, Dunham, Clark, Griffin & Moran

[57] ABSTRACT

An electronic identification system for livestock, particularly adapted to tagging ruminating animals, such as cattle and sheep, comprising a transmitter capsule which is implantable in the animal and precoded to broadcast a series of binary coded electric pulses peculiar to the animal. An associated interrogator-receiver device may be provided for inducing power into the capsule and for detecting the coded transmissions from the capsule to identify the animal. The receiver output may be utilized for a visual display or suitably interfaced with a computer while in the case of ruminants the capsule may be designed by adjusting its specific gravity to reside permanently in the animal's second stomach or reticulum and be reusable after slaughter.

14 Claims, 4 Drawing Figures

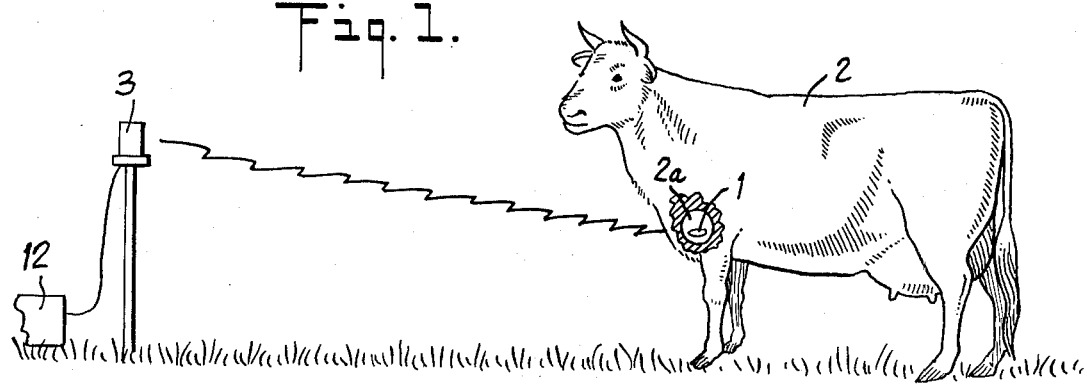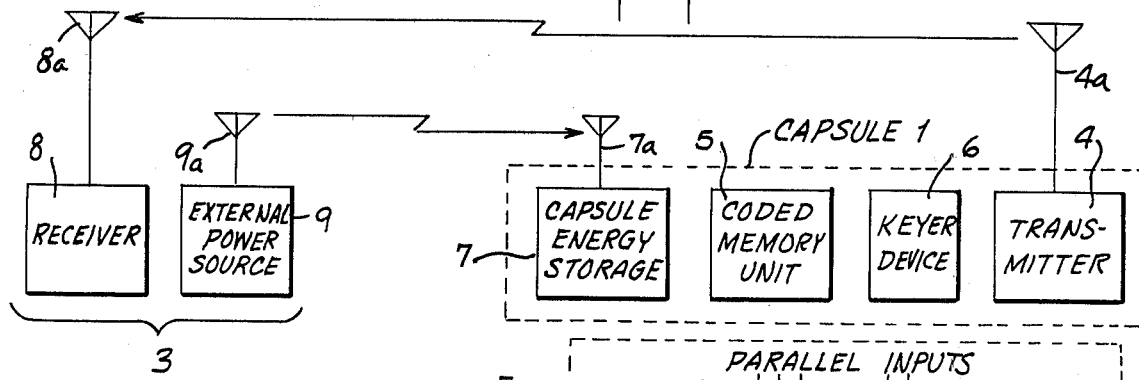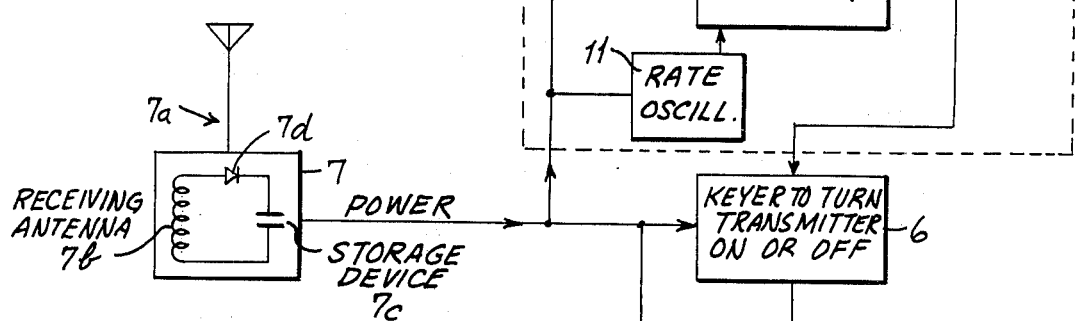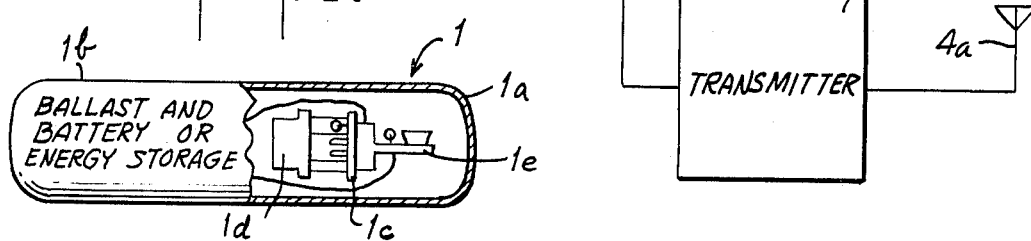

ELECTRONIC LIVESTOCK IDENTIFICATION SYSTEM

CROSS-REFERENCES

This is a continuation-in-part of our application Ser. No. 430,564 filed on Jan. 3, 1974 which in turn was a continuation of our application Ser. No. 304,776 filed on Nov. 8, 1972 both now abandoned.

BACKGROUND OF THE INVENTION

The present invention relates to a system for animal identification and more particularly to a system for electronically tagging livestock using an internal transmitter, which preferably may be made to reside in the reticulum of ruminants.

An enduring problem in the livestock industry has been the lack of an adequate system of animal identification suitable for use in preventing rustling, aiding in disease control, and facilitating animal inventory during marketing and slaughter. The traditional method of identification has, of course, been hot-iron branding but more recently freeze branding and various other external tagging techniques have been developed. However, most of the presently used systems only lend themselves to herd identification and no effective system is known which is capable of wide spread use in uniquely identifying individual animals and which is also suitable for all identification purposes. For example, while a serial number collar tagging system might be suitable for uniquely identifying animals for disease identification and inventory purposes, it would be quite susceptible to altering for purposes of rustling. In addition, while many systems might be suggested which theoretically would meet all of the technical requirements, still in order for a system to achieve widespread use, it must gain general acceptance among the members of the industry.

The system of the present invention, which may be used in lieu of or supplementary to present external branding or tagging techniques, is believed to fulfill all of the basic requirements for a unique animal identification system suitable for the purposes noted above, particularly in the case of ruminating animals.

SUMMARY OF THE INVENTION

The present invention embodies a device for internal insertion in an animal to be identified and comprises a capsule or "pill" containing an electronic transmitter which is uniquely coded to broadcast a series of electronic pulses from each animal in which it is internally implanted. An associated interrogator-receiver unit, which is preferably situated externally of the animal, may be used for sensing and appropriately utilizing the electronic pulses to identify the animal. While the capsule may be implanted subdermally, it is particularly adapted to be orally implanted in ruminating animals such as cattle, sheep, and goats, to take advantage of the peculiar stomach configuration of ruminants, wherein it may be made to permanently reside in the second stomach or reticulum by weighting to produce the proper specific gravity. The internally retained capsule is designed to contain a binary coded memory, a transmitter means and a power supply. The power supply may be in the form of a long life battery, but is preferably a passive storage element into which power may be induced from the interrogator unit thus rendering the capsule useful for the life of the animal and capable of recovery and reuse upon the slaughter of the animal.

To identify an animal when using a passive storage element in the capsule, the interrogator-receiver unit is used to transmit power to the power storage element and to key the coded memory to transmit a string of binary digit pulses peculiar to the animal being interrogated, which pulses are then detected by the interrogator-receiver unit and utilized in whatever mode is desirable in the situation, such as by visual display, teletype, computer or recorder.

It will be seen that this system offers many advantages over known systems in that it can be used in lieu of or supplementary to present branding methods; it provides a unique means of identifying an individual animal and yet is capable of universal use among animals; it is easy to apply, for example in the case of ruminants, by means of a conventional balling gun, commonly-used for oral drug administering; it is easily reusable after slaughter of the animal and yet during the life of the animal is extremely difficult to alter without surgery; and it may be made simple and inexpensive to manufacture. Other advantages and applications of the invention will become apparent to those skilled in the art upon a consideration of the following more detailed description.

BRIEF DESCRIPTION OF THE DRAWINGS

FIG. 1 illustrates a system in accordance with the present invention showing a cow with an identifying capsule element implanted in its reticulum.

FIG. 2 is a block diagram of the components of one form of animal identification system in accordance with the present invention.

FIG. 3 is a block circuit diagram of the electronic components incorporated in a capsule element of the present invention.

FIG. 4 is a sectional diagram of an actual capsule element.

DETAILED DESCRIPTION OF A PREFERRED EMBODIMENT OF THE INVENTION

Although the present invention may be found suitable for use in diverse animal identification applications, the preferred embodiment is particularly adapted for use with ruminating animals and will be specifically described in connection therewith.

As shown in FIG. 1, the basic system of the present invention involves the use of an identifying transmitter capsule unit 1, which is adapted to be internally implanted in a ruminating animal, such as a cow 2 for permanent residence in its reticulum 2a, and an interrogator unit 3 for providing a read-out of the identifying signal transmitted by the capsule unit 1. It has been found that a suitable capsule may be orally administered to an animal in a simple 10 second operation by means of a balling gun, such as commonly used by ranchers to administer drugs orally to cattle, by inserting the gun loaded with the capsule down the esophagus of the animal and plunging the capsule into the stomach. The capsule will then through peristaltic action be brought to reside in the second stomach or reticulum of a ruminant where it can be made to remain permanently if the capsule has certain qualities as will be more fully described hereinafter. The capsule may later be recovered at the time of slaughter of the animal and returned to an owner to be used again in another animal.

More particularly, as shown in FIG. 2, the capsule unit 1 of the system contains a small transmitter unit 4, a coded memory unit 5, a keying device 6, and a source of power 7, while the interrogator unit 3 comprises a receiver unit 8 and preferably an external power transmitter 9 which transmits power to the capsule power source 7. Although a long-life battery might be found satisfactory for the capsule power source 7 in some applications, it is preferred that this power source 7 be a passive unit of the energy storage type. Thus power source 7, as shown in FIG. 3, may comprise an antenna unit 7a, including a suitable receiving coil 7b, and an energy storage unit including a storage capacitor 7c, along with a rectifier 7d for building up a charge on the capacitor 7c. As will be explained more fully below a 1000 microfarad capacitor has been found suitable for this purpose and the receiving coil 7b is such as will be tuned to the frequency of the external power transmitter 9 by this capacitor.

The external power transmitter 9 is preferably operated at a frequency in the range of 4 to 250 megacycles, since this spans amateur bands and is capable of good power transmission, and at a power in the range of 100 watts or more. Transmitter 9 radiates energy through antenna 9a into the implanted capsule where it is stored by the capacitor 7c and released upon reaching a threshold level to power the electronics in the capsule unit 1. With this arrangement, the capsule unit 1 need only be "powered up" at those times when it is desired to interrogate the animal. While the use of such an external powering arrangement might presently limit the feasible range of interrogation of the animal to about 10 or 15 feet, such a range should be quite satisfactory for many applications of the present invention. The use of more powerful sources for long-range applications will be within the purview of those skilled in the art.

Next, the coded memory unit 5 of the present invention is preferably composed of a series of suitable shift registers. The shift registers may be in the form of commercially available electronic circuits into which, depending upon their wiring, binary coded digital bits of information (0's and 1's) can be shifted in a parallel or simultaneous fashion. The information may be stored therein and when desired shifted out of the register in serial fashion for transmittal to the transmitter unit 4. As the integrated circuit, parallel-in, serial-out shift registers presently available contain eight bits per register, conveniently three of these storage elements may be used to store a unique code of 24 bits for an individual animal. If the first bit is used to ready the receiver unit 8 for the transmission, the remaining 23 bits of usable information will permit a series of capsules incorporating this system to be made for uniquely identifying approximately 8,400,000 different animals.

A unique code may be inserted into the memory unit 5 of each capsule using the technique of fusible links. As seen in FIG. 3, a shift register 10 has eight input lines 10–10h, each of which may be opened or allowed to remain closed so that either a numeral 1 or 0 may be accordingly coded into it. Thus, with all the leads connected, a fusing or burn-out current can be passed through and the appropriate leads fused or opened. When the system is interrogated by the interrogator unit 3 and the stored power reaches a threshold level, the keying device 6 will be operated and the stored information is shifted into the register and then serially shifted out at a suitable electronically specified rate. This may be accomplished by a rate oscillator 11 which shifts the bits out of the memory unit 5 at a rate of one millisecond per bit. Using 24 bits, including the start bit which tells the receiver unit 8 that the code is about to be transmitted, 24 milliseconds will be needed for transmitter 4 to transmit the code. The serial output of the shift register 10 is fed to keying device 6 which controls the transmitter 4. The transmitter 4 may comprise an amplitude modulated oscillator which will be accordingly keyed on and off or a frequency modulated oscillator whose output will be appropriately shifted between two frequencies. An amplitude modulated oscillator is preferred for the present system in view of the limited power available, since no power is required during the off segments such as when zeros are being transmitted. Thus the digital 1's and 0's key the transmitter 4 on and off until all of the bits are shifted out of the memory unit 5. Once all of the bits are shifted out of the memory unit 5, then the process is recycled electronically. The memory unit 5 is again loaded in a parallel fashion and the information serially shifted out repeating the described operation until the power is exhausted.

With regard to the power requirements, it has been found that the capsule transmitter 4 will broadcast the coded signal, at a frequency of 100 megacycles, a distance in excess of 100 feet for pick-up by the antenna 8a of receiver unit 8, using a power level of about 25 milliwatts. Thus, to transmit 24 bits under these conditions, an energy of $24 \times 25 \times 10^{-6}$ milliwatts, or 600 microjoules, would be needed for each transmission. However, under most circumstances, transmissions within a range of about 6 to 20 feet would probably be sufficient, so that power levels of the order of 2 milliwatts will prove feasible. Because of the possibility of an erroneous transmission, it is advisable that transmission of the coded signal be repeated about five times, so that under the initially indicated conditions, 3000 microjoules, or 3 millijoules of energy would be required. Since energy is $\frac{1}{2}CV^2$, and if storage capacitor 7c is selected to take a voltage of 6 volts, then the required capacitance is $6 \times 10^{-3}/36$ or 166 microfarads. Thus as suggested above, a 1000 microfarad capacitor rated at 6 volts would be suitable for use in the energy storage unit of capsule power source 7.

With regard to a suitable frequency of transmission for the transmitter unit 4, it has been found that higher frequencies are less attenuated by the flesh of the animal and thus have a greater range. Accordingly, a broadcast frequency of approximately 75 MHz has been found particularly suitable since this frequency lies in the interface between radio beacons for aircraft traffic and radio-controlled models, and below the FM band. It is preferred that the transmitter oscillator be crystal-controlled rather than non-crystal-controlled since the latter arrangement tends to drift in frequency with power supply voltage. As the power supply in the present system, that is, discharging capacitor 7c will not be fixed, the use of a crystal-controlled oscillator is advisable.

It has been found that for a transmitting range of from 10 to 20 feet the natural radiation pattern from the wires in the capsule system is sufficient to transmit the coded signal to the receiver unit 8, so that the need for a separate antenna unit is obviated. However, it may be found advisable to use a separate transmitter antenna 4a such as in the form of a length of wire, which may be buried in a plastic to increase its electrical length, to improve the radiation efficiency.

Receiver unit 8 for picking up the transmitted coded signal may take the form of any conventional amplitude modulation receiver without the audio section. The signal will be received at the antenna 8a, which is tuned to the transmitted frequency, amplified by three stages of amplification, and then demodulated to remove the carrier frequency (75 MHz) so that the code pulses are then available for suitable processing. As shown in FIG. 1, the code pulses may be fed to a suitable utilization unit 12 which may take the form of a visual display, teletype, computer, magnetic tape recorder, or the like. For example, the utilization device might be combined with a scale so that the animal may be simultaneously weighed and identified, and both pieces of information may be put on a magnetic tape to be later processed by a computer. Alternatively, a brand inspector might use a visual display utilization device which would as the animals pass by an interrogation point, provide immediate visual information as to their identity and ownership. It will be seen that the sensing range of the described system will be more than satisfactory for such applications since the interrogated animals will usually by confined, such as in an aisle or lane, passing by an interrogation point at which the interrogator unit 3 is located. The rate at which the animals move past the interrogation point poses no problem since the system will operate much faster than any animal can move.

A suitable code for utilization, for example in identifying cattle could first provide an indication of the state of origin of the particular steer, then its herd identification within the state, and then an individual identification number within the herd. The inclusion of the individual identification number, which would be desired perhaps by a rancher doing performance work with his herd or for disease control, might require more bits in the code than the 23 bit signal described herein. In such event further shift registers can be added to the memory unit in the capsule, but with more bits a higher expenditure of energy is required since more bits must be transmitted to complete a coded signal. Also due to the possibility of an erroneous transmission, the longer signal should be transmitted a number of times during each interrogation. In this regard, it is advisable to adapt the receiver unit 3, or utilization device 12 to require that two or perhaps three consecutive identical transmissions be received before the information is considered to be correct and passed on for further processing. In any event, it will be within the purview of those skilled in the art to easily modify the system of the present invention to render it suitable for particularized applications.

A preferred embodiment of a capsule unit in accordance with the present invention is shown in FIG. 4. A suitable capsule size has been found to be approximately ¾ inches in diameter and three inches long. The electronics are encapsulated in a housing 1a, of a material which can be accepted physiologically by the animal and yet not be attacked by the other contents in the animal's reticulum. In order to avoid regurgitation of the capsule by the animal, it has been found that in the case of both adult animals and new-born calves, if the capsule is weighted so as to have a suitable specific gravity, permanent retention in the reticulum is accomplished. The particular specific gravity required may vary somewhat for different animals, but is has been found that little success is achieved with values of less than about 1.5 specific gravity. Capsules with specific gravities of approximately 1.7 or greater have been successfully retained and permanent retention is assured with specific gravities of 2 or greater.

The capsule shown in FIG. 4 comprises a glass housing 1a into which the electronics and a weight 1b to give the necessary specific gravity, are inserted. The capsule is then evacuated and sealed off. In addition to glass, quartz and fiberglass resin have also been found to be suitable as encapsulating materials. The electronics are shown to include a keyer board and memory 1c, a keyer operational amplifier transistor 1d and an oscillator board 1e. It is contemplated that most of the electronics such as the transistor, capacitors, resistors, and shift registers may be fabricated in integrated circuit form so that everything with the possible exception of the receiving antenna, transmitting antenna, power storage capacitor, crystal (if a crystal-controlled oscillator is used), and possibly certain large resistors can be fabricated on a chip of silicon. Thus, substantial miniaturization and reduction in the cost of the electronics may be accomplished.

It will be seen therefore that the capsule of the present invention may be constructed as a passive entity containing no power source and into which power may be readily induced from an external transmitter so that the capsule itself need never "wear out". Further, the capsule can be recovered upon slaughter of the animal and returned to the user for reuse in his herd, thus allowing the original cost to be amortized over many animals. Since a single interrogator-receiver unit can be used with any number of capsules the overall cost of the system can be minimized. Also the labor involved in operating the system is minimal, since the capsule can be quickly and simply inserted in an animal and the interrogation operation can be carried on automatically. In this latter regard, an interrogator-receiver unit may be set up at the end of an aisle or runway and herds of cattle passed thereby.

As a steer passes the interrogator-receiver unit power continuously transmitted by the external power transmitter will be induced in the capsule energy storage unit and upon reaching a threshold value will key the keying device to operate the capsule transmitter. The coded memory unit then automatically controls the keying device to cause the capsule transmitter to transmit the coded signal contained in the capsule memory. Transmission of the coded signal will be repeated until the stored power in the capsule runs out. The transmitted signal will be picked up in the interrogator-receiver and may automatically be fed to a suitable utilization device. All of these operations can be carried out continuously without the need for a special operator or attendant.

The location of the capsule within the animal, of course, renders the system extremely resistant to altering of the animals identification for the purposes of rustling or other illegal activities.

We claim:

1. A device adapted for use in a system for personal animal identification or tagging of ruminants comprising:
   (a) capsule means for internally residing permanently in the reticulum of a ruminant to be identified;
   (b) coded means in said capsule means for producing a distinctive identification signal peculiar to said animal;
   (c) transmitter means in said capsule means for transmitting said distinctive identification signal; and
   (d) power means in said capsule means for powering said coded means and said transmitter means; and wherein the specific gravity of said capsule means and its contents is at least about 1.5.

2. A device as in claim 1 wherein said transmitter means comprises a crystal-controlled oscillator.

3. A device as in claim 1 wherein said capsule means is of a material selected from the group consisting of glass, quartz and fiberglass resin.

4. An electronic tagging capsule, for internal retention in ruminant animals comprising:
   (a) precoded means for producing a distinctive signal identifying the animal in which the capsule is retained;
   (b) transmitter means for transmitting said distinctive identifying signal;
   (c) power means for powering said precoded means and said transmitter means; and
   (d) means for encapsulating said precoded means, transmitter means, and power means such that said capsule is capable of ingestion by a ruminant animal and said encapsulating means comprises a weight which in combination with the weight of said precoded means, transmitter means and power means renders the specific gravity of said capsule sufficient to cause said capsule to permanently reside in the reticulum of a ruminant animal.

5. A capsule as in claim 4 wherein the combined weights of said precoded, transmitter, power, and encapsulating means are such that the specific gravity of said capsule is at least about 1.5.

6. A capsule as in claim 4 wherein the combined weights of said precoded, transmitter, power, and encapsulating means are such that the specific gravity of said capsule is in the range from 1.5 to 1.7.

7. A capsule as in claim 4 wherein the combined weights of said precoded, transmitter, power, and encapsulating means are such that the specific gravity of said capsule is 1.7 or greater.

8. A capsule as in claim 4 wherein the combined weights of said precoded, transmitter, power, and encapsulating means are such that the specific gravity of said capsule is about 2 or greater.

9. A capsule as in claim 4 wherein said encapsulating means is of a material selected from the group consisting of glass, quartz and fiberglass resin.

10. A system for individually identifying or tagging particular ruminant animals comprising:
    (a) transmitting means including a transmitter for transmitting a fixed electronic signal peculiarly coded to identify a particular animal;
    (b) capsule means for retaining said transmitting means permanently within the reticulum of said particular animal;
    (c) power means in said capsule means for supplying power to said transmitting means to power the transmission of said fixed identification signal; and
    (d) receiver means located externally of said particular animal for receiving said fixed identification signal; and wherein the combined weights of said transmitting means, capsule means and power means are such that the specific gravity of their combination is at least about 1.5.

11. Apparatus as in claim 10 wherein said power means comprises energy storage means and further comprising interrogator means disposed externally of said animal for transmitting energy for storage in said power means.

12. Apparatus as in claim 11 wherein said transmitting means further comprises keying means for selectively communicating stored energy from said power means to power said transmitter when said stored energy reaches a threshold level.

13. Apparatus as in claim 12 wherein said transmitting means further comprises digitally coded memory means for selectively controlling said keying means.

14. Apparatus as in claim 13 wherein said memory means comprises a parallel-in, serial-out shift register.

* * * * *

UNITED STATES PATENT AND TRADEMARK OFFICE
CERTIFICATE OF CORRECTION

PATENT NO. : 4,262,632
DATED : April 21, 1981
INVENTOR(S) : John P. Hanton et al It is certified that error appears in the above-identified patent and that said Letters Patent are hereby corrected as shown below:

Col. 5, line 23, "by" first occurrence should read --be--.

Col. 5, line 65, "is" should read --it--.

Claim 11, line 1, "Apparatus" should read --A system--

Claim 12, line 1, "Apparatus" should read -- A system --

Claim 13, line 1, "Apparatus" should read -- A system --

Claim 14, line 1, "Apparatus" should read --A system--

On the title page, add Item [73] to read:
--- Assignee: Research Corporation, New York, N.Y. ---.

Signed and Sealed this

First Day of September 1981

[SEAL]

Attest:

GERALD J. MOSSINGHOFF

Attesting Officer — Commissioner of Patents and Trademarks